United States Patent
Haikonen

(10) Patent No.: US 7,092,921 B2
(45) Date of Patent: Aug. 15, 2006

(54) ARTIFICIAL ASSOCIATIVE NEURON SYNAPSE

(75) Inventor: Pentti Haikonen, Helsinki (FI)

(73) Assignee: Nokia Corporation, Espoo (FI)

( * ) Notice: Subject to any disclaimer, the term of this patent is extended or adjusted under 35 U.S.C. 154(b) by 419 days.

(21) Appl. No.: 10/451,719

(22) PCT Filed: Oct. 31, 2001

(86) PCT No.: PCT/FI01/00950

§ 371 (c)(1),
(2), (4) Date: Nov. 26, 2003

(87) PCT Pub. No.: WO02/052500

PCT Pub. Date: Jul. 4, 2002

(65) Prior Publication Data

US 2004/0117334 A1    Jun. 17, 2004

(30) Foreign Application Priority Data

Dec. 22, 2000  (FI)  .................. 20002853

(51) Int. Cl.
*G06E 1/00* (2006.01)
(52) U.S. Cl. ..................................................... 706/15
(58) Field of Classification Search .................. 706/15
See application file for complete search history.

(56) References Cited

U.S. PATENT DOCUMENTS

| | | | | |
|---|---|---|---|---|
| 4,920,508 A | * | 4/1990 | Yassaie et al. ............... | 708/603 |
| 5,075,889 A | * | 12/1991 | Jousselin et al. ............. | 365/73 |
| 5,091,864 A | * | 2/1992 | Baji et al. ...................... | 706/42 |
| 5,191,637 A | | 3/1993 | Furuta et al. ................. | 395/27 |
| 5,212,766 A | * | 5/1993 | Arima .......................... | 706/25 |
| 5,241,509 A | * | 8/1993 | Jousselin et al. ...... | 365/230.01 |
| 5,485,416 A | | 1/1996 | Ward .......................... | 364/825 |
| 5,751,913 A | | 5/1998 | Chiueh et al. ................ | 395/27 |

FOREIGN PATENT DOCUMENTS

| | | |
|---|---|---|
| EP | 1033660 | 9/2000 |
| GB | 2249680 | 5/1992 |
| WO | 9843159 | 10/1998 |
| WO | 9854653 | 12/1998 |

OTHER PUBLICATIONS

"Artificial Neural Networks: A Tutorial", A. Jain et al, *Computer*. Mar. 1996, pp. 31-43.
"A Single-Transistor Silicon Synapse", C. Diorio et al, *IEEE Transactions on Electron Devices*, vol. 43, No. 11, Nov. 1996, pp. 1972-1980.
*Patent Abstract of Japan, Publication No. 09-006743, publication date Jan. 10, 1997, "Method and Device for Updating Coupling Coefficient for Pulse Density Type Signal Processing Curcuit Network"

* cited by examiner .

*Primary Examiner*—Wilbert L. Starks
*Assistant Examiner*—Mai T. Tran

(57) ABSTRACT

The invention relates to a method for determining a weight coefficient of an artificial associative neuron synapse, where the synaptic weight coefficient is determined on the basis of the temporal average of a product of two signals. The method comprises the steps of taking temporal samples from the product of said two signals at such moments when one of the signals starts to deviate from zero, feeding said samples into such a shift register chain, from where a predetermined number of said samples taken at previous moments are continuously available, deducing on the basis of said samples taken at previous moments, whether a value deviating from zero is to be set as the synaptic weight coefficient. The invention also relates to an artificial associative neuron synapse.

21 Claims, 2 Drawing Sheets

ARTIFICIAL ASSOCIATIVE NEURON SYNAPSE

CROSS-REFERENCE TO RELATED APPLICATIONS

This is the national stage of International Application PCT/FI01/00950 having international filing date of 31 Oct. 2001, published in English Jul. 4, 2002 (WO 02/052500 A1), which in turn claims priority from Finnish Patent Application FI 20002853, filed 22 Dec. 2000.

BACKGROUND OF THE INVENTION

1. Technical Field

The invention relates to a method for determining a weight coefficient for an artificial associative neuron synapse and a corresponding artificial associative neuron synapse. The invention particularly relates to implementing the synapse in such an artificial associative neuron in which the weight coefficient, or strength, of the synapse is determined on the basis of a temporal average of the product of two signals according to the Hebb rule or a modification thereof (Jain, Anil K., Mao Jianchang, Mohiuddin K. M. (1996) "Artificial Neural Networks: A Tutorial" in *Computer*, March 1996, p. 31 to 44).

2. Discussion of Related Art

International patent application WO 98/43159 discloses an artificial associative neuron that can be used in artificial neural networks. The neurons are connected in parallel to form layers, and such layers are arranged in succession to form a neural network. Neural networks can be used in various calculation and pattern recognition tasks.

FIG. 1 illustrates a prior art associative neuron including n synapses. Since the number n may be quite high (ranging from 100 to 10 000, for example), FIG. 1 shows only the first, second and nth synapse of the neuron. The input signals of the neuron are a main signal s and associative signals $a_1$, $a_2$, ... $a_n$. Label so indicates the output signal of the neuron. Said signals are, for example, voltage levels. Circuit blocks 1 to 4, 8 to 11 and 12 to 15 correspondingly describe the first, second and nth synapse of the neuron, and its operation is described in greater detail below. Block 5 is a summing circuit in which the output signals obtained from the synapses are summed. Block 6 is a summing circuit in which the main signal s and the sum of the output signals obtained from the synapses are summed. Block 7 is a threshold circuit.

Information about the simultaneous occurrence of the main signal s arriving at the associative neuron and the associative signal $a_i$ (where i=1,2 ... ,n) arriving at the synapse is stored in the synapses. This information may be presented, for example, in voltage form so that the voltage concerned represents the temporal average of the product $s*a_i$ of the main signal and the associative signal. For this purpose the synapse includes a multiplier block (blocks 1, 8, 12) in which said product is calculated ($s*a_i$). In FIG. 1, signals s and $a_1$ are applied to the first synapse in order to calculate said product, and the product $s*a_1$ is calculated in the multiplier block 1. Signals s and $a_2$ are applied to the second synapse, and the product $s*a_2$ is calculated in the multiplier block 8 of the second synapse, and signals s and $a_n$ are applied to the nth synapse, and the product $s*a_n$ is calculated in the multiplier block 12 of the nth synapse.

If the signals s and $a_i$ can have only the logical values 0 and 1 (for example, a particular supply voltage value corresponds to the logical value 1 and the zero level corresponds to the logical value 0), then said product ($s*a_i$) can be calculated as a logical product. The logical product ($s*a_i$) is applied to blocks 2 (first synapse), 9 (second synapse) and 13 (n synapse), in which the temporal average of said product is formed and maintained. The temporal average is conveyed from blocks 2, 9 and 13 to blocks 3, 10 and 14, respectively.

In blocks 3, 10 and 14 the temporal average is compared to a particular threshold level. When the temporal average exceeds the threshold level, then said associative signal $a_i$ can be considered to correlate with the main signal s. Thus, a value deviating from zero, i.e. number 1, is set as the actual strength of the synapse or as the weight coefficient, the value otherwise being zero. The desired weight coefficient of the synapse $w_i$, where i=1,2, ... ,n depending on the synapse concerned, is the output of blocks 3, 10 and 14. For example, the weight coefficient $w_1$ of the first synapse is the output of block 3, the weight coefficient $w_2$ of the second synapse is the output of block 10, and the weight coefficient $w_n$ of the nth synapse is the output of block 14. The weight coefficient of the synapse obtains value 0 or 1.

The weight coefficients of the first, second and nth synapse are applied to blocks 4, 11 and 15, respectively, in which the weighted product $w_i * a_i$ is calculated in order to obtain the output signals of the synapses. Said output signals are applied to block 5, where they are summed, as mentioned above. The sum is applied to block 6, in which the main signal s is summed with the sum of the output signals obtained from the synapses calculated in block 5. The output signal of block 6 is applied to block 7. Block 7 is a threshold circuit that determines the output signal so of the entire neuron by comparing the sum calculated in block 6 to a particular threshold voltage. The signal so is thus the output signal of block 7, which is simultaneously the output signal so of the entire neuron.

A problem with such an associative neuron synapse is the technical implementation of the generation and maintenance of the temporal average of the product of said two signals ($s*a_i$).

FIG. 2 shows a known implementation that is applicable for determining the weight coefficient of each associative neuron synapse shown in FIG. 1. This known implementation is a circuit having said two signals as the input signals thereof, i.e. the main signal s and the associative signal $a_i$. The output signal of the circuit is the weight coefficient $w_i$ of the synapse. The subindex i may obtain values 1 to n depending on which synapse weight coefficient is being determined.

The main signal s and the associative signal $a_i$ are applied to an AND circuit, AND1, where the logical product of the signals s and $a_i$ is formed. The AND1 circuit implements the multiplier block 1, 8 or 12 of the synapse shown in FIG. 1. As both the main signal s and the associative signal $a_i$ have a logical value 1, the output of AND1 circuit obtains value 1, whereas it otherwise obtains value zero. As noted above, the logical value 1 may correspond to a particular voltage value of a signal (such as 3.3 V) and the logical value 0 may correspond to the voltage value zero, for example.

The logical product, or the AND1 circuit output, is applied through a diode D1 and a resistor R11 to a temporal averaging RC circuit that comprises a resistor R21 and a capacitor C11. The resistor R21 and capacitor C11 are connected from one end to the ground level and from the other end to the other end of the resistor R11. As the logical product is 1, the output of the AND1 circuit is nearly the same as the supply voltage of the AND circuit, in which case the capacitor C11 is charged towards the supply voltage with the time constant $\tau$, where $\tau = R11 * C11$ In the time constant equation R11 is the resistance of the resistor R11 and C11 is the capacitance of the capacitor C11. The time constant equation holds true when the resistor R21 is much higher than the resistor R11, in which case the effect of the resistor R21 on the time constant can be left unnoticed.

When the logical product is 0, the output of the AND1 circuit goes to the zero level, whereby the capacitor C11 is discharged (partly or entirely depending on the discharge time) through the resistor R21, until the logical product again obtains the value 1, whereby the charging state of the capacitor C11 starts to increase again. The diode D1 prevents the discharging of the capacitor C11 through the resistor R11 and the AND1 circuit. Thus the capacitor C11 can be discharged through the resistor R21 only with the time constant $\tau$, where $\tau = R21 * C11$ In the time constant equation R21 is the resistance of the resistor R21 and C11 is the capacitance of the capacitor C11. The capacitor C11 is charged and discharged as a temporal function of the logical product $s*a_i$. The temporal average of the logical product is then stored in the capacitor and is instantaneously represented by a voltage across the capacitor C11. The diode D1, the resistors R11 and R21 as well as the capacitor C11 thus implement block 2, 9 or 13 shown in FIG. 1.

The voltage across the capacitor C11 is applied to the first input of a voltage comparator COMP1. The input impedance of the voltage comparator COMP1 is high so that the capacitor C11 cannot be discharged through here. A particular reference voltage V is applied to the second input of the voltage comparator COMP1. If the signals s and $a_i$ simultaneously obtain value 1 sufficiently many times so that the voltage of the capacitor C11 exceeds the reference voltage of the voltage comparator COMP1, i.e. the so-called learning threshold of the synapse, then the output voltage of the voltage comparator COMP1 rises up.

The output of the voltage comparator COMP1 is applied to a set reset circuit SR1. A reset signal generally provided with value 0 is the second input in the set reset circuit SR1. The set reset circuit SR1 comprises two outputs Q and Q', one of which being inverted. The value of the output Q is the weight coefficient $w_i$ of the synapse. When the output voltage of the voltage comparator COMP1 increases, the set reset circuit SR1 permanently changes its state from value 0 to value 1, so that the output Q, i.e. the weight coefficient $w_i$ of the synapse, obtains the value 1. The voltage comparator COMP1 and the set reset circuit SR1 thus implement block 3, 10 or 14 shown in FIG. 1 for the generation of the weight coefficient $w_i$ of the synapse.

A microcircuit implementation of the RC circuit shown in FIG. 2 presents a problem, as the required time constants call for high capacitance values. However, in practice only fairly small capacitors, with capacitances of 1 pF or less, can realistically be placed onto the microcircuit. If the capacitor C11 is of this size, then the resistor R21 must correspondingly have an extensively high value (typically 1 T$\Omega$ or higher), for the desired time constant. The implementation of such a high resistance on the microcircuit is nevertheless difficult. In addition, a capacitor of the magnitude 1 pF takes up a lot of space on the microcircuit.

DISCLOSURE OF INVENTION

The present invention is a new invention that proposes to solve the prior art problem. According to a first aspect of the invention there is provided a method for determining a weight coefficient of an artificial associative neuron synapse the weight coefficient being determined by temporal behaviour of a product of two signals, the method comprising:

forming the product of said two signals and storing the temporal behaviour of the product of said two signals; and determining the weight coefficient of the synapse on the basis of the stored temporal behaviour of the product of said two signals.

The method is characterized in that the storing of the temporal behaviour of the product of said two signals is carried out in a shift register chain.

The determination of the weight coefficient of the synapse based on the temporal behaviour of the product of said two signals refers, for example, to the determination of the weight coefficient on the basis of how frequently said two signals occur simultaneously. Storing the temporal behaviour of the product of said two signals refers, for example, to the storage of the values of the product of said two signals at different moments at a shift register included in the synapse, which in an embodiment of the invention comprises two or more serially connected D flip-flop circuits. Storing the values of the product of said two signals in the synapse may be temporary in such a manner that only a particular number of the product values preceding the present time are kept in the shift register at a time.

According to a second aspect of the invention there is provided an artificial associative neuron synapse, whose weight coefficient is determined by temporal behaviour of a product of two signals, the synapse comprising:

a circuit element for forming the product of said two signals and circuit elements for storing the temporal behaviour of the product of said two signals; and circuit elements for determining the weight coefficient of the synapse on the basis of the stored temporal behaviour of the product of said two signals.

The synapse is characterised in that it comprises:

a shift register chain for storing the temporal behaviour of the product of said two signals.

According to a third aspect of the invention there is provided a method for determining a weight coefficient of an artificial associative neuron synapse, wherein the weight coefficient of the synapse is determined on the basis of temporal average of a product of two signals.

The method is characterized by:

taking temporal samples from the product of said two signals at such moments when one of the signals changes so that it deviates from zero, forwarding said samples into such a shift register chain, from which a predetermined number of said samples taken at previous moments are at each moment available, deducing on the basis of said samples taken at previous moments whether a value deviating from zero is to be set as the weight coefficient of the synapse.

Preferably but not necessarily a sample is taken at all such time instants when one of said signals changes so that it deviates from zero. This means that the sample is taken preferably always (but not necessarily always), when, for example, the first one of the two signals changes so that it deviates from zero.

According to a fourth aspect of the invention there is provided an artificial associative neuron synapse, wherein a weight coefficient of the synapse is determined on the basis of a temporal average of a product of two signals.

The synapse is characterized by comprising:

means for taking a temporal sample of the product of said two signals at such moments when one of said signals changes so that it deviates from zero;

a shift register chain, from which a predetermined number of the samples taken at previous moments are at each moment available, means for setting the weight coefficient of the synapse on the basis of the temporal average of said samples.

It is an object of an embodiment of the invention to bypass the restrictions involved in microcircuit technology by implementing an averaging circuit as a combination of easily implementable circuit elements that are physically as small as possible.

BRIEF DESCRIPTION OF THE DRAWINGS

In the following the invention is described in greater detail with reference to the accompanying drawings, in which.

BEST MODE FOR CARRYING OUT THE INVENTION

Figure 1:
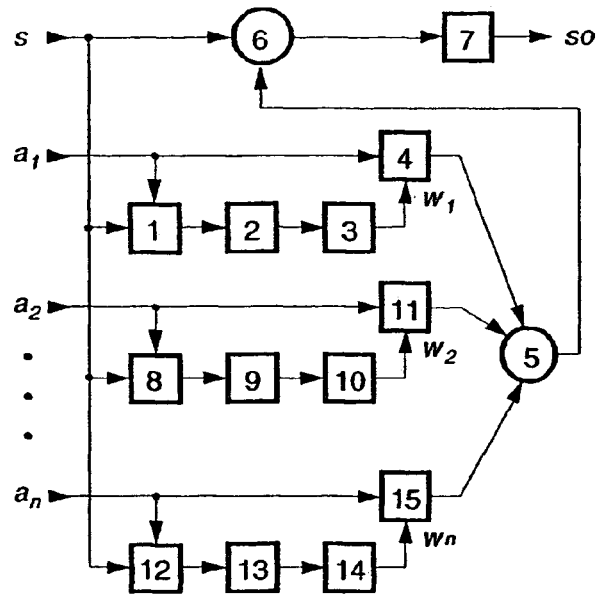
FIG. 1 illustrates a prior art associative neuron.
Figure 2:
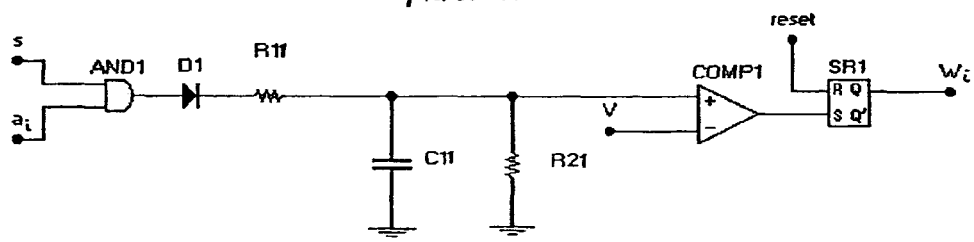
FIG. 2 shows a prior art implementation that is applicable for determining the weight coefficient of the associative neuron synapse shown in FIG. 1.
Figure 3:
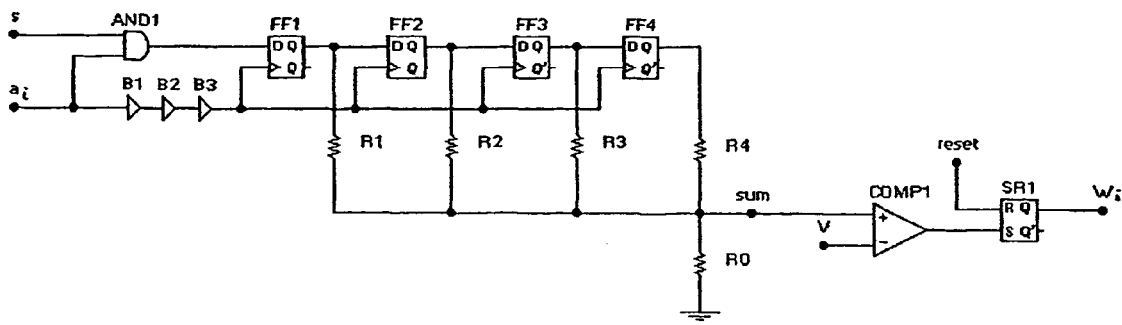
FIG. 3 shows a circuit according to a preferred embodiment of the invention for determining the weight coefficient of an artificial associative neuron synapse.

FIGS. 1 and 2 have already been explained in connection with the prior art description. FIG. 3 shows a circuit according to a preferred embodiment of the invention for determining the weight coefficient of an artificial associative neuron synapse.

The input signals of the circuit are a main signal s and an associative signal $a_i$. The output signal of the circuit is a weight coefficient $w_i$ of the synapse. The signals s and $a_i$ are applied to an AND circuit AND1, which forms a logical product ($s*a_i$) of the signals s and $a_i$. The logical product is applied to a shift register chain, which is composed of D flip-flop circuits FF1, FF2, FF3 and FF4. Each D flip-flop circuit comprises an input D, an input for a clock signal >, an output signal Q and an inverted output signal Q'. The D flip-flop circuits operate in such a manner, that whenever the clock signal is received at the input >, that is clocking occurs, the D flip-flop circuit copies the input signal D to the output Q.

The output of AND1 circuit is connected to the input D of the first D flip-flop circuit FF1. The output Q of the first D flip-flop circuit FF1 is connected to the input D of the second flip-flop circuit FF2 and through a resistor R1 to a first input of a voltage comparator COMP1. The output Q of the second D flip-flop circuit FF2 is connected to the input D of the third D flip-flop circuit FF3 and through a resistor R2 to the first input of the voltage comparator COMP1. The output Q of the third D flip-flop circuit FF3 is connected to the input D of the fourth D flip-flop circuit FF4 and through a resistor R3 to the first input of the voltage comparator COMP1. The output Q of the fourth D flip-flop circuit FF4 is connected through a resistor R4 to the first input of the voltage comparator COMP1. The first input of the voltage comparator COMP1 is connected to the ground level by means of a resistor R0. A second input of the voltage comparator COMP1 is connected to a reference voltage V. The output of the voltage comparator is connected to an input S of a set reset circuit SR1. A reset signal, which in a standard situation has value zero, is connected to an input R of the set reset circuit. The output Q of the set reset circuit is the weight coefficient $w_i$ of the synapse. The set reset circuit also includes an inverted output Q'. The weight coefficient $w_i$ of the synapse is further applied to an AND circuit (not shown in FIG. 3), and the associative signal $a_i$ is applied to the second input thereof. Said AND circuit implements block 4, 11 or 15 known from FIG. 1, in which a weighted product $w_i*a_i$ is calculated in order to obtain the output signal of the synapse.

All D flip-flop circuits are clocked simultaneously using a clocking signal. In the example shown in FIG. 3 the associative signal $a_i$ is used as the clocking signal. In other words, the associative signal $a_i$ is applied, in addition to the input of the AND1 circuit, to the inputs > of the clock signal in the D flip-flop circuits via a certain delay circuit. Buffer circuits B1, B2 and B3 function as the delay circuit in the example shown in FIG. 3. They cause a slight delay to the associative signal $a_i$ so that the inputs of the D flip-flop circuits have time to settle before the clocking occurs. Alternatively the main signal s can be used for clocking.

Let us next examine in more detail how the circuit shown in FIG. 3 operates. At the beginning, all the inputs D and outputs Q of the D flip-flop circuits are at zero or ground level. The output of the AND1 circuit is also at zero. When the main signal s applied to the circuit and the associative signal $a_i$ rise to the supply voltage (the supply voltage is indicated with symbol U below), that is obtain value 1, the output of the AND1 circuit obtains value 1. The output of the AND1 circuit is connected to the input D of the first D flip-flop circuit FF1. When the value 1 of the associative signal operating as a clock signal arrives after a delay to the clocking signal input > of the D flip-flop circuit FF1, the input D is has already the value 1. Clocking occurs at the rising edge of the associative signal $a_i$ functioning as the clocking signal, i.e. when the voltage level at the clocking signal input > rises from zero level to the supply voltage. During this clocking (referred to as the first clocking), the value 1 in the input D of the first D flip-flop circuit is copied to the output Q of the first D flip-flop circuit. In other words, when clocking occurs a temporal sample is taken from the logical product of the signals s and $a_i$ and is stored as the output of the first D flip-flop circuit FF1. In the other D flip-flop circuits FF2, FF3 and FF4 the outputs Q still remain at zero value, as the inputs D thereof were set at value zero during the first clocking.

When the associative signal $a_i$ arriving at the circuit next obtains value 1, the next clocking takes place in the shift register chain. This clocking is referred to as the second clocking. Depending on the value of the main signal s the output of the AND1 circuit and at the same time the input D of the first D flip-flop circuit now obtain the value 0 or 1, which is copied during the second clocking to the output of the first D flip-flop circuit and to the input of the second D flip-flop circuit. The signal value 1 that was copied during the previous clocking (the first clocking) from the input of the first D flip-flop circuit FF1 to the output, i.e. to the input of the second D flip-flop circuit FF2, is now copied during the second clocking from the input of the second D flip-flop circuit FF2 to the output, i.e. to the input of the third D flip-flop circuit FF3.

During next that is the third clocking the signal at the output of the AND1 circuit, or the signal at the input of the first D flip-flop circuit FF1 is copied from the input of the first D flip-flop circuit FF1 to the output, i.e. to the input of the second D flip-flop circuit FF2. The signal at the input of the second D flip-flop circuit FF2 is copied during the third clocking to the output of the second D flip-flop circuit FF2, i.e. to the input of the third D flip-flop circuit FF3. And the signal at the input of the third D flip-flop circuit FF3 is copied during the third clocking to the output of the third D flip-flop circuit FF3, i.e. to the input of the fourth D flip-flop circuit FF4.

The voltage signals that indicate the logical value 0 or the logical value 1 thus shift one step forward in the shift register chain during each clocking. If the shift register chain comprises four D flip-flop circuits, then four consecutive values of the logical product $s*a_i$ are stored therein, i.e. values $$(s*a_i)_0, (s*a_i)_{-1}, (s*a_i)_{-2}, (s*a_i)_{-3},$$

where the first or the current value is the value calculated during the last clocking, the second value is the value calculated during the clocking preceding the last clocking, the third value is the value calculated two clockings ago and the fourth value is the value calculated three clockings ago. Of these logical product values the current value is stored into the output of the first D flip-flop circuit FF1, the value calculated during the clocking preceding the last clocking is stored into the output of the second D flip-flop circuit FF2, the value calculated two clocking moments ago is stored into the output of the third D flip-flop circuit FF3 and the value calculated three clockings ago is stored into the output of the fourth D flip-flop circuit FF4.

The temporal average over the four recent samples of the logical product is formed in the resistor summing network R1, R2, R3, R4, R0, and is obtained from the expression $$[(s*a_i)_0+(s*a_i)_{-1}+(s*a_i)_{-2}+(s*a_i)_{-3}]/4.$$

The resistor summing network R1, R2, R3, R4, R0 produces a voltage representation of the temporal average of the logical product. Said voltage is witnessed at a node point SUM, to which all resistors R1, R2, R3, R4 and R0 are connected from one end. Since the resistors R1, R2, R3, R4 and R0 are in turn connected from one end either to the ground or to the supply voltage U, the voltage $V_{SUM}$ of the node point SUM is obtained from the equation $$V_{SUM} = \frac{k}{m} \cdot U,$$

where k is the number of resistors that are connected to the supply voltage U and m is the number of resistors that are connected to the ground (zero level). It is assumed, when deducing the equation, that all resistors R1, R2, R3, R4 and R0 are of the same size, meaning that they have the same resistance. A typical value for the resistors R1, R2, R3, R4 and R5 is 10 to 100 MΩ, but the resistance of the resistors may also deviate from these limits.

It can be observed from the above equation that the voltage $V_{SUM}$ of the node point increases linearly, when more and more resistors are connected to the supply voltage U (the resistor is connected to the supply voltage U, when the corresponding output of the D flip-flop circuit has the logical value 1), The voltage $V_{SUM}$ of the node point SUM is at the same time the input voltage of one input (+ terminal) of the voltage comparator COMP1, also called the "first" input above.

The equation above shows that if the number of resistors is 5(m=5) then the $V_{SUM}$ may obtain values 0, 1/5 U, 2/5 U, 3/5 U and 4/5 U depending on how many of the outputs in the D flip-flop circuits FF1 to FF4 have the logical value 1 (=supply voltage U). If for example two of the four consecutive values of the logical product $s*a_i$ represent value 1 (i.e. m=2) the voltage $V_{SUM}$ of the node point SUM obtains value 2/5 U. If in turn all four of the four consecutive values of the logical product $s*a_i$ represent value 1, then the voltage $V_{SUM}$ of the node point SUM obtains value 4/5 U.

A reference voltage V is connected to the second input (− terminal) of the voltage comparator. The reference voltage V is adjusted in advance to such a value that if an adequate number of the consecutive product values of the signals s and $a_i$ obtains value 1 (both signals s and $a_i$ obtain value 1), the voltage $V_{SUM}$ of the node point SUM, which at the same time is the first input signal of the voltage comparator COMP1, exceeds the reference voltage V. When the reference voltage V or the learning threshold of the synapse is exceeded, the output signal of the voltage comparator COMP1 rises up to the value 1 causing the set reset circuit SR1 connected to the output of the voltage comparator COMP1 to change its state permanently from value 0 to value 1, in a similar way as described before in connection with the prior art description. The output signal of the set reset circuit is the weight coefficient $w_i$ of the associative synapse.

Figure 4:
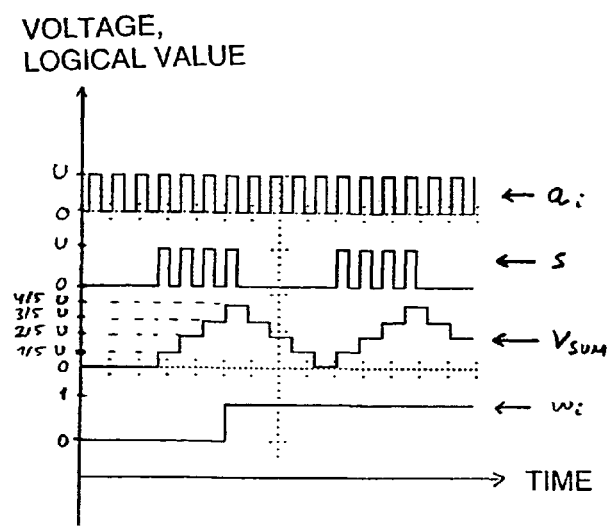
FIG. 4 illustrates signal wave forms describing how the circuit shown in FIG. 3 operates.

FIG. 4 illustrates signal wave forms describing the operation of the circuit shown in FIG. 3. The topmost signal is an associative signal $a_i$, the second signal from the top is the main signal s, the third signal from the top is a summing signal $V_{SUM}$ of the resistor summing network and the lowest signal is the weight coefficient $w_i$ of the artificial associative neuron synapse i. The horizontal axis represents time. The vertical axis represents voltage or the logical value.

In the example shown in FIG. 4 the signal wave form of the associative signal $a_i$ and the main signal s is a pulse train. One pulse, whose height corresponds to the supply voltage U, corresponds to the logical value 1. The zero level corresponds to the logical value 0. The length of the voltage pulse typically ranges from a few milliseconds to hundreds of milliseconds, but it may also vary beyond these limits. The signal wave form of the summing signal $V_{SUM}$ of the resistor summing network as a function of time is a staircase function and the signal mode of the weight coefficient $w_i$ is a step function.

Calculated from the beginning of the examination at the fourth associative signal pulse, both the associative signal and the main signal obtain value 1. Thus the summing signal $V_{SUM}$ of the resistor summing network increases by one step, or obtains value 1/5 U. In the example shown in FIG. 4, both the associative signal and the main signal obtain value 1 at the fifth, sixth and seventh associative signal pulse. The $V_{SUM}$ thus increases by one step again at the fifth pulse, or obtains value 2/5 U. At the sixth pulse the $V_{SUM}$ again increases by one step, or obtains value 3/5 U. Then at the seventh pulse the $V_{SUM}$ increases to voltage value 4/5 U.

In the example shown in FIG. 4 the reference voltage V is set at such a value that when the $V_{SUM}$ increases to voltage value 4/5 U, the $V_{SUM}$ exceeds the value of the reference voltage, in which case the weight coefficient of the synapse, that is the synaptic weight coefficient, provided by the set reset circuit permanently rises from zero to value 1. After this, the values of the associative signal and the main signal have no effect on the weight coefficient of the synapse. Even though the $V_{SUM}$ drops in the example shown in FIG. 4 during the following associative signal pulses to a level that is lower than the reference voltage V, the weight coefficient $w_i$ remains at value 1.

The advantage of the inventive solution shown in FIG. 3 is that it can be easily realized using basic circuits suitable for microcircuit implementation. For example, a resistor ranging from 10 MΩ to 100 MΩ is still of a reasonable size and it can be implemented as an actual resistor or as a FET transistor (Field Effect Transistor) for example. The advantage of the resistor summing method is also the possibility to adjust easily the learning threshold of the synapse by adjusting the reference voltage V of the voltage comparator COMP1. The reference voltage can for example be set to such a value that the voltage value 3/5 U at the + input of the voltage comparator suffices to change the weight coefficient $w_i$ from value 0 to value 1.

Figure 5:
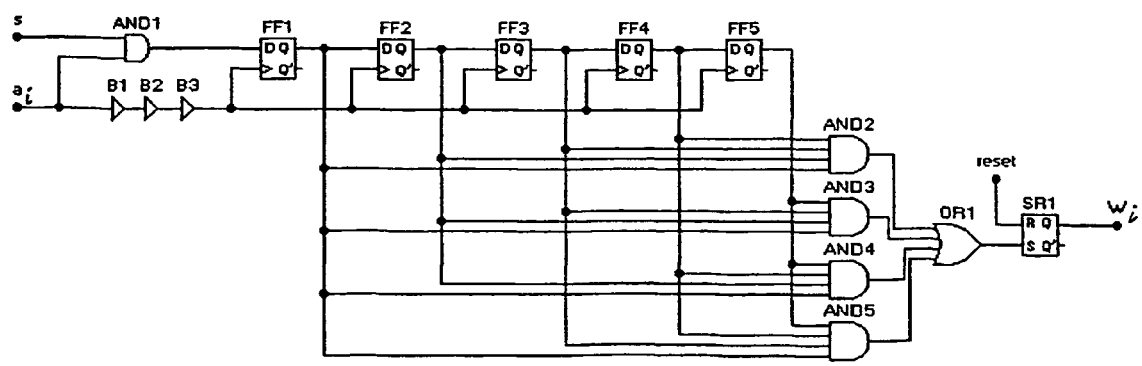
FIG. 5 illustrates another implementation of the invention.

Applications, in which a fixed learning threshold can be used for the synapse, may employ the solution shown in FIG. 5 where the resistor summing network and the voltage comparator COMP1 of FIG. 3 are replaced by combinatory logic.

The input signals $a_i$ and s form a logical product in the AND1 circuit. The D flip-flop circuits are further clocked at the rising edge of the associative signal $a_i$. The clocking signal is further delayed by buffer circuits B1, B2 and B3, and the value of the logical product is shifted one step forward in the shift register chain during the clocking, as is shown in FIG. 3. The last one of the logical product values is found at the output of the first D flip-flop circuit FF1. The logical product value at the clocking preceding the last clocking is stored at the output of the second D flip-flop circuit FF2 in the shift register chain, the value calculated two clockings ago is stored at the output of the third D flip-flop circuit FF3, the value calculated three clockings ago is stored at the output of the fourth D flip-flop circuit FF4 and the value calculated four clockings ago is stored at the output of the fifth D flip-flop circuit FF5.

On the circuit shown in FIG. 5, the fixed learning threshold is 4/5, i.e. four cases out of five. In other words, if four out of five consecutive values of the logical product $s*a_i$ have value 1, the weight coefficient $w_i$ permanently changes from value 0 to value 1. Thus, cases 11110, 11101, 11011 and 10111 are concerned. These cases are identified using AND circuits AND2, AND3, AND4 and AND5 in the following way.

The output of the first D flip-flop circuit indicating the last value of the logical product ($s*a_i$), or the current value, is conveyed to all AND circuits from AND2 to AND5. In addition the outputs of the second, third and fourth D flip-flop circuit FF2 to FF4 are conveyed to the AND2 circuit. Thus the AND2 circuit identifies the case 11110. The outputs of the second, third and fifth D flip-flop circuits FF2 to FF3 and FF5 are in addition to the current value of the logical product ($s*a_i$) conveyed to the AND3 circuit. The AND3 circuit thus identifies the case 11101. In addition to the current value of the logical product ($s*a_i$) the outputs of the second, fourth and fifth D flip-flop circuit FF2, FF4 and FF5 are conveyed to the AND4 circuit. The AND4 circuit thus identifies the case 11011. The outputs of the third, fourth and fifth D flip-flop circuits FF3, FF4 and FF5 are in addition to the current value of the logical product ($s*a_i$) conveyed to the AND5 circuit. Thus the AND5 circuit identifies the case 10111.

The outputs of the AND circuits AND2, AND3, AND4 and AND5 are connected to an OR circuit OR1 that identifies the situation in which one of the cases identified by the AND circuits AND2 to AND5 has come true. If one of the cases identified by the AND circuits has come true, then the output of said AND circuit changes to value 1. Since the outputs of the AND circuits are connected to the inputs of the OR1 circuit, the output of the OR1 circuit simultaneously changes from value 0 to value 1, whenever one of the AND outputs changes to value 1. The output of the OR1 circuit is connected to the input S of the set reset circuit SR1. Thus, as the output of the OR1 circuit changes to value 1, the output of the set reset circuit, i.e. the synaptic weight coefficient $w_i$ changes permanently from value 0 to value 1.

It should be evident that the solution of the invention can be modified within the scope of the basic idea of the invention. For example, the length of the shift register chain can be altered by increasing or reducing the number of D flip-flop circuits. The shift register chain includes at least two flip-flop type devices, such as D flip-flop circuits in order that it have the properties of both shifting and memory. These are also called latches, multivibrators, binaries, etc. Preferably there are more of them, like 4 or 5, but depending on the application the number of D flip-flop circuits may be even larger. The resistors R1, R2, R3, R4 and R0 are preferably of the same size. However, the resistance value of one or more resistors may deviate from the other resistance values. For example in certain situations improved noise tolerance can be achieved if the resistance in the resistor R1 is lower than in the other resistors. The resistor summing network can be replaced by a capacitor network if the input impedance of the comparator COMP1 is very high. In that case the resistors R1, R2, R3, R4 and R0 in the circuit shown in FIG. 3 are replaced with the capacitors C1, C2, C3, C4 and C0 respectively. Preferably the capacitance values of the capacitors are equal in size. Alternatively the capacitance of one or more capacitors can, however, deviate from the other capacitance values, and the invention can still be used. The capacitive summing network draws less current than a resistive summing network implemented by means of resistors. In the circuit shown in FIG. 5 the combinatory logic can be carried out in various ways.

The artificial associative neuron synapse of the invention is implemented using an appropriate microcircuit technology.

The implementation and embodiments of the invention are described in this specification by way of examples. It will be evident for those skilled in the art that the invention is not restricted to the details described in the above embodiments and that the invention can be implemented in other ways without deviating from the characteristics of the invention. The embodiments described are to be considered instructive but not restricting. Therefore the implementation and use of the invention are only restricted by the attached claims. The different alternatives to implement the invention defined in the claims including equivalent implementations are also included in the scope of the invention.

The invention claimed is:

1. A method for determining a weight coefficient of an artificial associative neuron synapse the weight coefficient being determined by temporal behaviour of a product of two signals, the method comprising:

forming the product of said two signals and storing the temporal behaviour of the product of said two signals; and determining the weight coefficient of the synapse on the basis of the stored temporal behaviour of the product of said two signals, characterized in that the storing of the temporal behaviour of the product of said two signals is carried out in a shift register chain.

2. A method as claimed in claim 1, characterized by taking temporal samples of the product of said two signals at such moments, when one of said signals changes so that is deviates from zero, feeding said samples into such a shift register chain, from which a predetermined number of said samples taken at previous moments are available at each moment, deducing on the basis of the samples taken at the previous moments whether a value deviating from zero is to be set as the weight coefficient of the synapse.

3. A method as claimed in claim 1, characterized in that said two signals and the weight coefficient of the synapse only obtain logical values 0 and 1, and the product of said two signals is formed as a logical product.

4. A method as claimed in claim 1, characterized in that said shift register chain comprises at least two D flip-flop circuits connected in series.

5. A method as claimed in claim 2, characterized in that temporal samples are taken from said product of two signals always at such a moment when one of said signals changes so that is deviates from zero.

6. A method as claimed in claim 2, characterized in that said sample values form in a particular summing circuit a sum value, on the basis of which a conclusion is drawn whether a value deviating from zero is to be set as the weight coefficient of the synapse.

7. A method as claimed in claim 6, characterized in that said sum value represents a temporal average of the product of said two signals.

8. A method as claimed in claim 6, characterized in that said sum value is formed using a resistor network where all the resistor values are equal.

9. A method as claimed in claim 6, characterized in that said sum value is formed using a resistor network where at least the value of one resistor deviates from the values of the other resistors in the resistor network.

10. A method as claimed in claim 8, characterized in that said resistor network comprises a set of resistors, which are connected to a common node point and whereof at least one is connected to the ground level and said sum value is formed in said node point.

11. A method as claimed in claim 6, characterized in that said sum value is formed by means of a capacitor network in which all the capacitor values are the same.

12. A method as claimed in claim 6, characterized in that said sum value is formed by means of a capacitor network, in which the value of at least one capacitor deviates from the values of the other capacitors in the capacitor network.

13. A method as claimed in claim 11, characterized in that said capacitor network comprises a set of capacitors which are connected to a common node point and whereof at least one is connected to the ground level and said sum value is formed in said node point.

14. A method as claimed in claim 2, characterized in that the deduction for setting the weight coefficient of the synapse to deviate from zero is carried out using combinatory logic (AND2 to AND5, OR1) which concerns said sample values.

15. An artificial associative neuron synapse, having a weight coefficient determined by temporal behaviour of a product of two signals, the synapse comprising:

a circuit element (AND 1) for forming the product of said two signals and circuit elements (FF1–FF4) for storing the temporal behaviour of the product of said two signals; and circuit elements (COMP1, SR1) for determining the weight coefficient of the synapse on the basis of the stored temporal behaviour of the product of said two signals, characterized in that the synapse comprises:

a shift register chain (FF1 to FF4) for storing the temporal behaviour of the product of said two signals.

16. A synapse as claimed in claim 15, characterized by comprising the product of said two signals, means (AND1, B1 to B3, FF1) for taking a temporal sample of the product of said two signals at such a moment when one of said signals changes so that it deviates from zero, the shift register chain (FF1 to FF4), from which a predetermined number of samples taken at previous moments are at each moment available, means (R0 to R4, C0 to C4, COMP1, SR1) for setting the weight coefficient of the synapse on the basis of the temporal average of said samples.

17. A synapse as claimed in claim 16, characterized by comprising a summing circuit (R0 to R4, C0 to C4) for calculating a particular sum value on the basis of said samples, and a deduction logic (COMP 1) arranged to deduce on the basis of said sum value whether a value deviating from zero is to be set as the weight coefficient of the synapse.

18. A synapse as claimed in claim 16, characterized by comprising a combinatory logic (AND2 to AND5, OR1) reading said sample values and arranged to deduce whether the weight coefficient of the synapse is to be set to deviate from zero.

19. A synapse as claimed in claim 17, characterized by comprising as said summing circuit one of the following: a resistor network (R0 to R4), a capacitor network (C0 to C4).

20. A method for determining a weight coefficient of an artificial associative neuron synapse, wherein the weight coefficient of the synapse is determined on the basis of temporal average of a product of two signals, characterized by:

taking temporal samples from the product of said two signals at such moments when one of the signals changes so that is deviates from zero, forwarding said samples into such a shift register chain, from which a predetermined number of said samples taken at previous moments are at each moment available, deducing on the basis of said samples taken at previous moments whether a value deviating from zero is to be set as the weight coefficient of the synapse.

21. An artificial associative neuron synapse, wherein a weight coefficient of the synapse is determined on the basis of a temporal average of a product of two signals, characterized by comprising:

means (AND1) for taking a temporal sample of the product of said two signals at such moments when one of said signals changes so that it deviates from zero;

a shift register chain (FF1 to FF4), from which a predetermined number of the samples taken at previous moments are at each moment available, means (R0 to R4, C0 to C4, COMP1, SR1) for setting the weight coefficient of the synapse on the basis of the temporal average of said samples.

* * * * *